(12) United States Patent
Guo et al.

(10) Patent No.: US 9,960,454 B2
(45) Date of Patent: May 1, 2018

(54) WICKING NONWOVEN MAT FROM WET-LAID PROCESS

(71) Applicant: JOHNS MANVILLE, Denver, CO (US)

(72) Inventors: Zhihua Guo, Centennial, CO (US); Souvik Nandi, Highlands Ranch, CO (US); Jawed Asrar, Englewood, CO (US); Albert G Dietz, III, Davidson, NC (US)

(73) Assignee: Johns Manville, Denver, CO (US)

( * ) Notice: Subject to any disclaimer, the term of this patent is extended or adjusted under 35 U.S.C. 154(b) by 0 days. days.

(21) Appl. No.: 15/600,456

(22) Filed: May 19, 2017

(65) Prior Publication Data

US 2017/0256823 A1 Sep. 7, 2017

Related U.S. Application Data

(63) Continuation of application No. 14/642,273, filed on Mar. 9, 2015.

(51) Int. Cl.

| | |
|---|---|
| *H01M 10/12* | (2006.01) |
| *D04H 1/4218* | (2012.01) |
| *D04H 1/64* | (2012.01) |
| *H01M 4/62* | (2006.01) |

(Continued)

(52) U.S. Cl.
CPC .......... *H01M 10/12* (2013.01); *D04H 1/4218* (2013.01); *D04H 1/64* (2013.01); *H01M 2/1613* (2013.01); *H01M 4/62* (2013.01); *D10B 2101/06* (2013.01); *D10B 2401/022* (2013.01); *D10B 2505/00* (2013.01); *H01M 2/145* (2013.01); *H01M 2/1646* (2013.01)

(58) Field of Classification Search
None
See application file for complete search history.

(56) References Cited

U.S. PATENT DOCUMENTS

| 2,978,529 A | 4/1961 | Brisley et al. | |
|---|---|---|---|
| 2003/0008214 A1* | 1/2003 | Zguris | H01M 2/1613 429/249 |

(Continued)

FOREIGN PATENT DOCUMENTS

| EP | 1 170 809 A1 | 1/2002 |
|---|---|---|
| WO | 2016/044139 A1 | 3/2016 |

*Primary Examiner* — Barbara L Gilliam
*Assistant Examiner* — Wyatt P McConnell
(74) *Attorney, Agent, or Firm* — Robert D. Touslee

(57) ABSTRACT

Examples of the present technology may include a method of making a non-woven fiber mat. The wet nonwoven fiber mat may include a first plurality of first glass fibers and a second plurality of second glass fibers. The first plurality of first glass fibers may have nominal diameters of less than 5 µm, and the second plurality of second glass fibers may have nominal diameters of greater than 6 µm. The method may further include curing the binder composition to produce the nonwoven fiber mat. The nonwoven fiber mat may have an average 40 wt. % sulfuric acid wick height of between about 1 cm and about 5 cm after exposure to 40 wt. % sulfuric acid for 10 minutes conducted according to method ISO8787, and the nonwoven fiber mat may have a total normalized tensile strength greater than 2 (lbf/in)/(lb/sq) fora sq (100 ft$^2$).

20 Claims, 5 Drawing Sheets

(51) Int. Cl.
*H01M 2/16* (2006.01)
*H01M 2/14* (2006.01)

(56) References Cited

U.S. PATENT DOCUMENTS

| | | | | |
|---|---|---|---|---|
| 2007/0141465 A1* | 6/2007 | Honbo | ............... | H01M 4/20 |
| | | | | 429/225 |
| 2011/0318643 A1* | 12/2011 | Clement | ............ | H01M 4/14 |
| | | | | 429/247 |

* cited by examiner

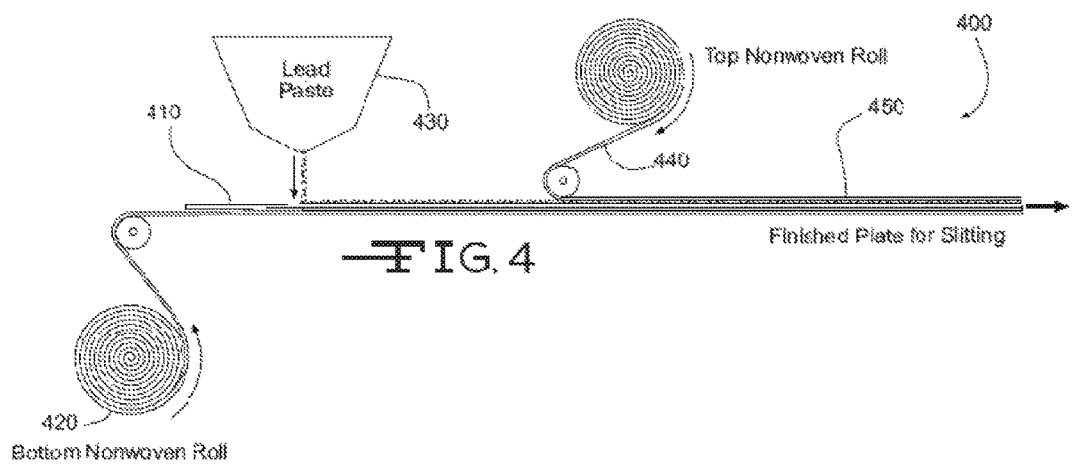

WICKING NONWOVEN MAT FROM WET-LAID PROCESS

CROSS-REFERENCES TO RELATED APPLICATIONS

This application is a continuation of U.S. Nonprovisional patent application Ser. No. 14/642,273, filed Mar. 9, 2015, the entire contents of which are incorporated by reference herein.

This application is related to Applicant's U.S. Nonprovisional patent application Ser. No. 14/642,361, entitled "SMALL PORE SIZE NONWOVEN MAT WITH HYDROPHILIC/ACID RESISTANT FILLER USED IN LEAD ACID BATTERIES AND APPLICATIONS THEREFOR," Guo et al. filed on Mar. 9, 2015, the entire contents of which are incorporated by reference herein.

BACKGROUND

Electrodes or electrode plates commonly used in lead-acid batteries often include a metallic grid that is used to support lead and/or lead oxide pastes. During charge and discharge cycles, the volume of the lead and/or lead oxide paste typically expands and contracts. Repeated usage and, thus, repeated charge and discharge cycles may have negative effects on the electrode, such as shedding of the active material particles of the lead and/or lead oxide pastes. To reduce those negative effects, the electrodes may be reinforced with paper to keep the lead or lead oxide paste intact. These papers also may have the advantage of wicking electrolyte along the electrode plates. This wicking may help battery performance. These pasting papers in the battery should have adequate wickability and tensile strength, including in the harsh chemical environment within the battery. These and other characteristics and improvements of pasting papers are addressed.

BRIEF SUMMARY

Processing methods, batteries, nonwoven fiber mats, and pasting papers may involve a greater fraction of coarse fibers than microfibers. This mixture of fibers, along with a binder composition, may be made into a nonwoven fiber mat with adequate wickability properties in batteries and superior mechanical strength characteristics. The superior strength characteristics may provide for more support for the electrode plates for AGM (Absorptive Glass Mat) batteries and for more robust batteries. The increased strength also may improve process efficiency and may reduce scrapping during battery manufacture. Wickability may be enhanced by adding a filler. Without a high concentration of microfibers, methods of manufacturing nonwoven fiber mats may not need acidic conditions to disperse microfibers. Without low pHs, processing equipment may not require stainless steel or other expensive materials. Additionally, the relative ease of dispersing and mixing fibers may allow for processes to be run continuously and without interruption, which may result in decreased costs and increased throughput.

Examples of the present technology may include a method of making a non-woven fiber mat for use in a lead-acid battery. The method may include adding a binder composition to a wet nonwoven fiber mat. The wet nonwoven fiber mat may include a first plurality of first glass fibers and a second plurality of second glass fibers. The first plurality of first glass fibers may have nominal diameters of less than 5 μm, and the second plurality of second glass fibers may have nominal diameters of greater than 6 μm. The first plurality of first glass fibers may have a weight between about 10% and about 50% of the combined weight of the first plurality of first glass fibers and the second plurality of second glass fibers. The method may further include curing the binder composition to produce the nonwoven fiber mat. The nonwoven fiber mat may have an average 40 wt. % sulfuric acid wick height of between about 1 cm and about 5 cm after exposure to 40 wt. % sulfuric acid for 10 minutes conducted according to method ISO8787, and the nonwoven fiber mat may have a total normalized tensile strength greater than 2 (lbf/in)/(lb/sq) for a sq of 100 ft². The normalized tensile strength is derived from the sum of the average machine direction tensile strength (lbf/in) and the average cross machine direction tensile strength (lbf/in), divided by the mat weight (lb/sq).

These or other examples of the present technology may include a lead-acid battery. The battery may include a positive electrode, a negative electrode, and a nonwoven fiber mat disposed adjacent the positive electrode or the negative electrode. The nonwoven fiber mat include a first plurality of first glass fibers having nominal diameters of less than 5 μm. The nonwoven fiber mat may further include a second plurality of second glass fibers having nominal diameters greater than 6 μm. The first plurality of first glass fibers may make up between about 10% and about 50% by weight of the combined weight of the first plurality of first glass fibers and the second plurality of second glass fibers. The nonwoven fiber mat may also include a binder composition. The nonwoven fiber mat may have an average 40 wt. % sulfuric acid wick height of between about 1 cm and about 5 cm after exposure to 40 wt. % sulfuric acid for 10 minutes conducted according to method ISO8787, while the nonwoven fiber mat may have a total normalized tensile strength of greater than 2 (lbf/in)/(lb/sq).

Some examples of the present technology may include a method of making a pasting paper for battery. The method may include applying an acid-resistant binder composition to a wet-laid mixture of glass fibers to form a wet nonwoven fiber mat. The mixture of glass fibers may include a first plurality of microfibers having an average diameter of between 0.5 μm and 1.0 μm and a second plurality of coarse fibers having an average diameter greater than or equal to 8 μm. The mass ratio of the first plurality of microfibers to the second plurality of coarse fibers may be between about 1:5 and about 1:1. The method may further include drying the wet nonwoven fiber mat. The method may also include curing the acid-resistant binder composition to produce a pasting paper. The pasting paper may have an average 40 wt. % sulfuric acid wick height of between about 1 cm and about 5 cm after exposure to 40 wt. % sulfuric acid for 10 minutes conducted according to method ISO8787. In addition, pasting paper may have a total normalized tensile strength of greater than 7 (lbf/in)/(lb/sq).

Additional examples and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

The present technology is described in conjunction with the appended figures:

FIG. 4 illustrates a process for preparing an electrode or plate having a nonwoven fiber mat disposed on or near a surface of the electrode or plate;

DETAILED DESCRIPTION

Conventional pasting papers for AGM batteries may be structurally weak. A majority of the fibers in the conventional pasting papers may be microfiber glass. The nonwoven fiber mat may have high wicking properties, above what is needed for lead-acid batteries and other applications. A wickable nonwoven fiber mat in a battery may help maintain electrolyte or other liquid coverage of electrode plates, but little, if any, data exist to support the high level of wickability in conventional nonwoven fiber mats. This overdesigned wickability characteristic may be the result of a higher concentration of microfibers relative to coarse fibers. An increased concentration of microfibers compared to coarse fibers may result in a nonwoven fiber mat with decreased mechanical strength, which may result from the lower individual mechanical strength of smaller diameter fibers.

Additionally, conventional processes, which may include specialty paper machines, of making nonwoven fiber mats for batteries and other applications may be more expensive and/or have lower throughput. The higher concentration of microfibers, which are generally more expensive than coarse fibers, may increase material cost. Acids may often be used to disperse microfibers to create a uniform mixture of microfibers and coarse fibers. The low pHs (usually less than 3) may be corrosive, and the process may require equipment made from stainless steel or other expensive materials. Because of the challenge in dispersing microfibers, conventional processes may be run in batch or semi-batch operations, instead of continuous operations, to ensure a sufficiently uniform mixture of fibers. A semi-batch operation may include using a first tank in the process while mixing fibers in a second tank, and then switching the process to the second tank while mixing fibers in the first tank. For these and other reasons, materials and methods used in conventional nonwoven fiber mat and battery technologies may not be cost effective or efficient.

Figure 1:
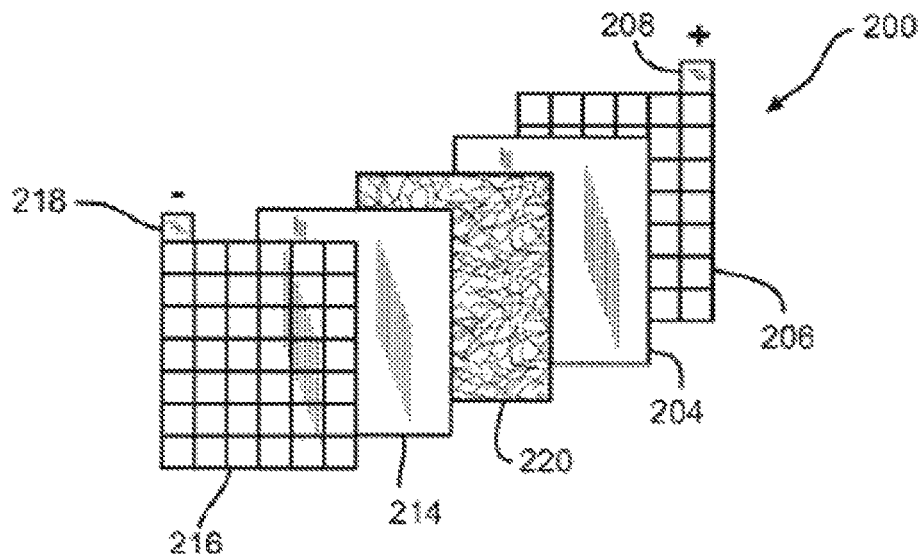
FIG. 1 illustrates an exploded perspective view of a battery cell assembly.
Figure 2:
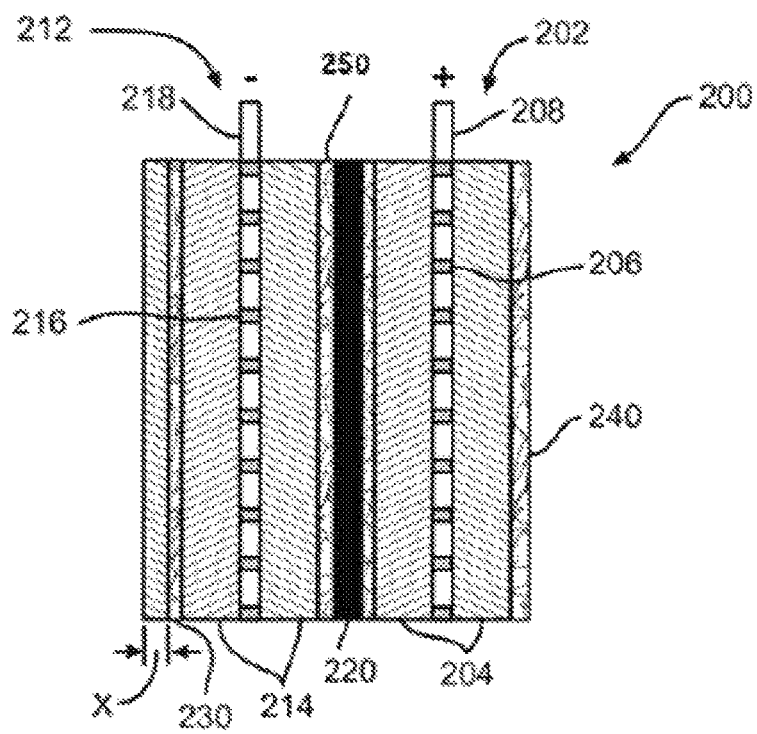
FIG. 2 illustrates an assembled cross section view of the battery cell assembly of FIG. 1.

FIGS. 1 and 2, respectively, show a perspective exploded view of a lead-acid battery cell 200 and a cross-section assembled view of the lead-acid battery cell 200. The lead-acid battery cell 200 may represent a cell used in either flooded lead-acid batteries or Absorptive Glass Mat (AGM) batteries. Each cell 200 may provide an electromotive force (emf) of about 2.1 volts and a lead-acid battery may include 3 such cells 200 connected in series to provide an emf of about 6.3 volts or may include 6 such cells 200 connected in series to provide an emf of about 12.6 volts, and the like. Cell 200 may include a positive plate or electrode 202 and a negative plate or electrode 212 separated by battery separator 220 so as to electrically insulate the electrodes 202 and 212. Positive electrode 202 may include a grid or conductor 206 of lead alloy material. A positive active material 204, such as lead dioxide, may typically be coated or pasted on grid 206. Grid 206 may also be electrically coupled with a positive terminal 208. Grid 206 may provide structural support for the positive active material 204 along with electrical conductivity to terminal 208.

Likewise, negative electrode 212 may include a grid or conductor 216 of lead alloy material that is coated or pasted with a negative active material 214, such as lead. Grid 216 may be electrically coupled with a negative terminal 218. Like grid 206, grid 216 structurally may support the negative active material 214 along with providing electrical conductance to terminal 218. In flooded type lead-acid batteries, positive electrode 202 and negative electrode 212 may be immersed in an electrolyte (not shown) that may include a sulfuric acid and water solution. In AGM type lead-acid batteries, the electrolyte may be absorbed and maintained within battery separator 220. Battery separator 220 may be positioned between positive electrode 202 and negative electrode 212 to physically separate the two electrodes while enabling ionic transport, thus completing a circuit and allowing an electronic current to flow between positive terminal 208 and negative terminal 218. Separator 220 may not include the fibers of the reinforcement mats. Separator 220 may include a microporous membrane (i.e., the solid black component), which is often a polymeric film having negligible conductance. The polymeric film may include micro-sized voids that allow ionic transport (i.e., transport of ionic charge carriers) across separator 220. In some examples, the microporous membrane or polymeric film may have a thickness of 50 micrometers or less, including 25 micrometers or less, may have a porosity of about 50% or 40% or less, and may have an average pore size of 5 micrometers or less, including 1 μm or less. The polymeric film may include various types of polymers including polyolefins, polyvinylidene fluoride, polytetrafluoroethylene, polyamide, polyvinyl alcohol, polyester, polyvinyl chloride, nylon, polyethylene terephthalate, and the like. Separator 220 may also include one or more fiber mats that are positioned adjacent one or both sides of the microporous membrane/polymeric film to reinforce the microporous membrane and/or provide puncture resistance.

Positioned near a surface of negative electrode 212 may be a nonwoven fiber mat 230 (referred to herein as a reinforcement mat). Reinforcement mat 230 may be disposed partially or fully over the surface of negative electrode 212 so as to partially or fully cover the surface. As shown in FIG. 2, a reinforcement mat 230 may be disposed on both surfaces of the negative electrode 212, or may fully envelop or surround the electrode. Likewise, although reinforcement mat 230 is shown on the outer surface of the electrode 212, in some examples, reinforcement mat 230 may be positioned on the inner surface of the electrode 212 (i.e., adjacent separator 220). Reinforcement mat 230 may reinforce the negative electrode 212 and may provide an additional supporting component for the negative active material 214. The additional support provided by reinforcement mat 230 may help reduce the negative effects of shedding of the negative active material particles as the active material layer softens from repeated charge and discharge cycles. This may reduce the degradation commonly experienced by repeated usage of lead-acid batteries.

Reinforcement mat 230 may often be impregnated or saturated with the negative active material 214 so that the reinforcement mat 230 is partially or fully disposed within the active material 214 layer. Impregnation or saturation of the active material within the reinforcement mat means that the active material penetrates at least partially into the mat. For example, reinforcement mat 230 may be fully impregnated with the negative active material 214 so that reinforcement mat 230 is fully buried within the negative active material 214 (i.e., fully buried within the lead paste). Fully burying the reinforcement mat 230 within the negative active material 214 means that the mat is entirely disposed within the negative active material 214. In examples, reinforcement mat 230 may be disposed within the negative active material 214 up to about a depth X of about 20 mils (i.e., 0.020 inches) from an outer surface of the electrode 212. In other examples, the glass mat 230 may rest atop the negative active material 214 so that the mat is impregnated with very little active material. Often the reinforcement mat 230 may be impregnated with the negative active material 214 so that the outer surface of the mat forms or is substantially adjacent the outer surface of the electrode 212 (see reinforcement mat 240). In other words, the active material may fully penetrate through the reinforcement mat 230 so that the outer surface of the electrode 212 is a blend or mesh of active material and reinforcement mat fibers.

The thickness of the glass mat may be a function of mat weight, binder content (Loss on Ignition [LOI]), and fiber diameter. The type of binder used and the length of the fibers may be weaker factors in determining the glass mat thickness. Higher binder content, however, may generally reduce the glass mat thickness, although excessive binder use may pose various processing challenges during mat production and thereafter. A lower mat weight may also reduce the mat thickness. The mat weight, however, may also be limited because the mat needs to provide enough tensile strength during winding and downstream processes.

As described herein, reinforcement mat 230 may include a plurality of glass fibers and an acid resistant binder that couples the plurality of glass fibers together to form the reinforcement mat. Reinforcement mat 230 may have an area weight of between about 10 and 100 $g/m^2$, including between about 20 and 60 $g/m^2$. Reinforcement mat 230 may be used for reinforcing a plate or electrode of a lead-acid battery and may include a relatively homogenous mixture of coarse glass fibers that may include a plurality of first glass fibers having a diameter between about 0.5-5 µm and a plurality of second fibers having a diameter of at least 6 µm. Relatively homogenous may mean that the mixture is at least 85% homogenous. In some examples the relatively homogenous mixture may make up between about 70-95% of the mass of the mat 230. In some examples, the homogenous mixture may also include 5-30% conductive fibers. For example, conductive fibers having diameters about 6 µm and above and having lengths between about 8 and 10 mm can be included in the relatively homogenous mixture. The reinforcement mat 230 also includes an acid resistant binder that bonds the plurality of first and second glass fibers together to form the reinforcement mat 230. The reinforcement mat 230 further includes a wetting component that is applied to reinforcement mat 230 to increase the wettability/wickability of the reinforcement mat 230. The wettability/wickability of the reinforcement mat 230 may be increased such that the reinforcement mat 230 has or exhibits an average 40 wt. % sulfuric acid wick height and/or water/acid solution wick height of at least 1.0 cm after exposure to the respective solution for 10 minutes in accordance with a test conducted according to method ISO8787.

Examples of the present technology may include coarse glass fibers and glass microfibers homogeneously dispersed throughout the nonwoven glass mat. These nonwoven glass mats may not involve a simple integration of parts or components. Instead, producing a nonwoven glass mat with coarse glass fibers in a wet laid process may require one set of parameters that are vastly different than the parameters that are used to produce a nonwoven glass mat with microfibers. In fact, many manufacturing parameters may be adjusted to produce a homogenous nonwoven glass mat. A homogenous nonwoven glass mat may provide benefits over layered construction. In layered construction, coarse fibers may tend to form a bottom layer and microfibers may form a layer on top of the bottom layer. Unlike a layered construction mat, a homogenous mat may have uniform resistance across the mat and may result in uniform current and utilization of active materials.

Reinforcement mat 230 may include a conductive material so as to make reinforcement mat 230 electrically conductive. For example, a conductive layer may be formed on one or more sides of reinforcement mat 230 by applying a conductive material to at least one surface of reinforcement mat 230 or throughout reinforcement mat 230. The conductive layer may be positioned to face and contact electrode 212 to provide electrical pathways along which the electrons may flow. The conductive material contacts the electrode 212, and more specifically the active material of electrode 212 to enable electron flow on a surface or through reinforcement mat 230. In some examples, the conductive layer of reinforcement mat 230 may be electrically coupled with a negative terminal 218 to provide a route or path for current flow to terminal 218. Conductive material is described in U.S. patent application Ser. No. 14/489,093 filed Sep. 17, 2014, which is incorporated herein by reference for all purposes.

As briefly described above, reinforcement mat 230 may include a plurality of electrically insulative fibers, such as glass, polyolefin, polyester, and the like, which are primarily used to reinforce the electrode. Because the reinforcement mat 230 may be made of such insulative fibers, the reinforcement mat 230 may be essentially non-conductive prior to or without the addition of the conductive material. For example, without combining or adding the conductive material/layer, the reinforcement mat 230 may have an electrical resistance greater than about 1 Megaohm per square. In manufacturing the reinforcement mat 230, water or another liquid may be removed (e.g., via a vacuum) from a suspension of the fibers in the liquid medium. A binder may then be applied to the wet-laid non-woven glass or polyolefin fibers to form reinforcement mat 230. As described previously, in some examples, the conductive material or fibers may be added to the binder and/or to the liquid medium. As an example, reinforcement mat 230 may have a thickness of between about 50 µm and about 500 µm and have an average pore size of between about 5 µm and about 5 millimeters.

The reinforcement mat 230 also may include a wetting component that is applied to the reinforcement mat to increase the wettability/wickability of the reinforcement mat. The wettability/wickability of the reinforcement mat 230 may be increased so that the reinforcement mat has or exhibits an average water wick height and/or average water/acid solution wick height of at least 0.5 cm after exposure to the respective solution for 10 minutes in accordance with a test conducted according to method ISO8787. The mat may exhibit an average water/acid solution wick height of at least 0.5 cm without an additional wetting component.

As described herein, the wetting component may be a wettable component of the acid resistant binder (e.g., a hydrophilic functional group), a hydrophilic binder that is mixed with the acid resistant binder, the wetting component may be component fibers (e.g., cellulose, cotton, other natural fibers, polyester, other synthetic fibers, or a combination of natural and/or synthetic fibers) that are bonded with the glass fibers of the reinforcement mat 230, or the wetting component may be a wettable solution (e.g., starch or cellulose solution) that is applied to the reinforcement mat 230 such that the wettable solution saturates the reinforcement mat 230 or is disposed on at least one surface of the reinforcement mat 230 upon drying of the wettable solution. In some examples, the wetting component may include a combination of any of the aforementioned components, such as a combination of cellulose fibers and an acid resistant binder having a wettable component. In specific examples, the glass fibers of reinforcement mat 230 may include first fibers having fiber diameters between about 0.5 µm and about 5 µm or between about 0.5 µm and about 1 µm and second fibers having fiber diameters of at least about 6 µm. According to some examples, the component fibers may form a component fiber mat that is bonded to at least one side of the glass reinforcement mat 230 such that the reinforcement mat 230 comprises a two layer mat configuration. The component fibers may be mixed with the glass fibers such that upon forming the glass mat the component fibers may be entangled with and bonded to the glass fibers.

Figure 3A:
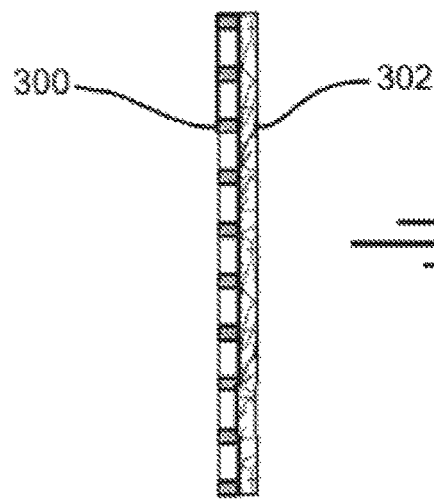
FIGS. 3A-3C illustrate cross section views of various configurations of an electrode or plate and a nonwoven fiber mat.
Figure 3B:
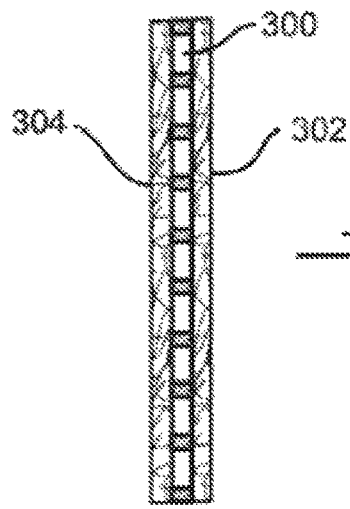
Figure 3C:
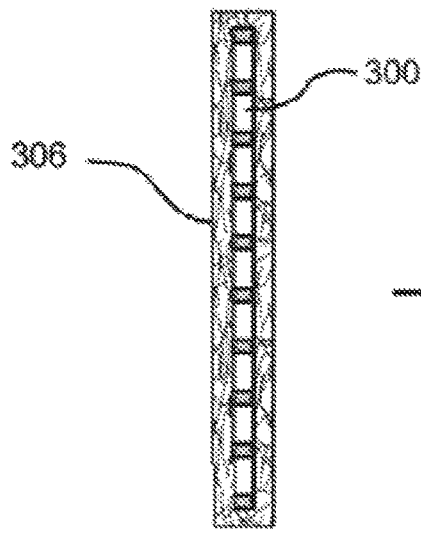

Referring now to FIGS. 3A-3C, illustrated are various electrode-reinforcement mat configurations. FIG. 3A illustrates a configuration where an electrode 300 has a single reinforcement mat 302 disposed on or near an outer surface. As described above, reinforcement mat 302 may include a conductive material and/or layer so as to enable electron flow on a surface and/or through reinforcement mat 302 to a battery terminal. Reinforcement mat 302 may also include a wetting component as described above to provide the mat 302 with enhanced wettability characteristics. Reinforcement mat 302 may partially or fully cover the outer surface of electrode 300. The configuration of FIG. 3B may be similar to that of FIG. 3A except that an additional reinforcement mat 304 may be disposed on or near an opposite surface of electrode 300 so that electrode 300 may be sandwiched between the two glass mats, 302 and 304. FIG. 3C illustrates a configuration where a reinforcement mat 306 may envelop or surround electrode 300. Although FIG. 3C illustrates the reinforcement mat 306 fully enveloping the electrode 300, in many examples a top side or portion of the mat 306, or a portion thereof, is open.

Referring back to FIGS. 1 and 2, positioned near a surface of positive electrode 202 is a reinforcement mat 240. Reinforcement mat 240 may be arranged and/or coupled with positive electrode 202 similar to the arrangement and coupling of reinforcement mat 230 with respect to negative electrode 212. For example, reinforcement mat 240 may be disposed partially or fully over the surface of positive electrode 202 so as to partially or fully cover the surface, may be positioned on an inner surface of the electrode 202 (i.e., adjacent separator 220) instead of the shown outer surface configuration, and/or may be impregnated or saturated with the positive active material 204 so that the reinforcement mat 240 is partially or fully disposed within the active material 204 layer. Like reinforcement mat 230, reinforcement mat 240 may provide additional support to help reduce the negative effects of shedding of the positive active material particles due to repeated charge and discharge cycles.

Regarding the reinforcement functions of reinforcement mats 230 and/or 240, in some examples the reinforcing aspects of these mats may be enhanced by blending fibers having different fiber diameters. Reinforcement mats 230 and 240 (referred to hereinafter as reinforcement mat 230) can have similar characteristics and compositions, and can include a blend of two or more different diameter fibers. Reinforcement mat 230 includes a plurality of first microfibers, having fiber diameters ranging between about 0.5 µm and about 5 µm, between about 0.5 µm and about 1 µm, or between about 0.7 µm and about 2 µm. The first microfibers are blended with a plurality of second coarse fibers, having fiber diameters of at least about 6 µm, including between about 8 µm and about 13 µm. In some examples, the plurality of second coarse fibers may include a silane material sizing. The blend of the two or more different diameter fibers results in a mat that is sufficiently strong to structurally support the active material as described above and to withstand the various plate manufacturing processes while also minimizing the thickness and overall size of the mat. Reducing the thickness of reinforcement mat 230 while maintaining mat strength may be desired since reinforcement mat 230 typically is a chemically inactive component and, thus, does not contribute to the battery's electrochemical process. Reducing the volume of reinforcement mat 230 helps minimize the battery's volume of non-electrochemically contributing components.

In examples, reinforcement mat 230 includes a blend of between 10% and 50% of the first microfibers and between 50% and 85% of the second coarse fibers. In these or other examples, reinforcement mat 230 may include a blend of between 20% and 30% of the first microfibers and between 70% and 80% of the second coarse fibers. In these or other examples, reinforcement mat 230 may include a blend of between 30% and 50% of the first microfibers and between 50% and 70% of the second coarse fibers. In some examples, reinforcement mat 230 may include a blend of between 10% and 40% of the first microfibers and between 60% and 85% of the second coarse fibers. In yet other examples, the blend of first microfibers and second coarse fibers is approximately equal (i.e., 50% of the first microfibers and second coarse fibers).

The length of the coarse fibers may also contribute to the overall strength of reinforcement mat 230 by physically entangling with adjacent fibers or fiber bundles and/or creating additional contact points where separate fibers are bonded via an applied binder. In examples, the coarse fibers have fiber lengths that range between about ⅓ inch and about 1½ inches, although an upper length limit of 1¼ inch is more common. This range of lengths provides sufficient mat strength while allowing the fibers to be dispersed in a white water solution for mat processing applications. In other examples, the coarse fibers have fiber lengths that range between ½ and ¾ of an inch. The fibers lengths of the first microfibers may be different than the fibers lengths of the second coarse fibers.

The type and amount of binder used to bond the first microfiber and second coarse fibers together may also contribute to the overall strength and thickness of reinforcement mat 230. As described above, the binder is generally an acid and/or chemically-resistant binder that delivers the durability to survive in the acid environment throughout the life of the battery, the strength to survive the plate pasting operation, and the permeability to enable paste penetration. For example, the binder may be an acrylic binder, a melamine binder, a UF binder, or the like. The binder may also include and bond the conductive material to the first and/or second coarse fibers. Increased binder usage may reduce the thickness of reinforcement mat 230 by creating more fiber bonds and densifying reinforcement mat 230. Increased fibers bonds may also strengthen reinforcement mat 230. In examples, the binder is applied to the first microfibers and second coarse fibers such that the binder includes between about 5% and 45% by weight of the reinforcement mat 230 or between about 10% and 35% by weight of the reinforcement mat. In some examples, the binder is applied to the first microfibers and second coarse fibers such that it includes between about 5% and 30% by weight of the reinforcement mat 230.

The wetting component may be mixed with the binder in some examples. The resulting reinforcement mat 230 may have or exhibit an average 40 wt. % sulfuric acid wick height of at least 0.5 cm after exposure to 40 wt. % sulfuric acid for 10 minutes conducted according to method ISO8787. The wetting component may be dissolvable in an acid solution of the lead-acid battery such that a significant portion of the nonwoven fiber mat is lost due to dissolving of the wetting component. For example, between about 5-85% of the mass of the reinforcement mat 230 may be lost.

In some examples, reinforcement mat 250 may also include a conductive material and/or layer to enable electron flow on a surface and/or through reinforcement mat 250 to positive terminal 208 and/or negative terminal 218.

In some examples, reinforcement mat 250 may also include a wetting component. For example, reinforcement mat 250 may include 10-40% of cotton fibers, such as cotton microfibers having diameters of between about 0.5 and 3.0 µm. The wetting component may increase the wettability/wickability of the reinforcement mat 250 such that the reinforcement mat 250 has or exhibits an average water wick height and/or water/acid solution wick height of at least 1.0 cm after exposure to the respective solution for 10 minutes in accordance with a test conducted according to method ISO8787. The wickability of the reinforcement map may reach the same wickability without the addition of a wetting component. Reinforcement mat 250 may be called a separator support and may include any of the compositions described for reinforcement mat 230.

Referring now to FIG. 4, illustrated is a process 400 for manufacturing an electrode. The process may involve transporting a lead alloy grid 410 on a conveyor toward an active material 430 applicator (e.g., lead or lead oxide paste applicator), which applies or pastes the active material 430 to the grid 410. A nonwoven mat roll 420 may be positioned below grid 410 so that a reinforcement mat is applied to a bottom surface of the grid 410. The reinforcement mat may include a conductive material and/or layer, as well as a wetting component, as described herein. In some examples, the reinforcement mat may also include a blend of fibers as described herein. In some examples, the reinforcement mat may also include a blend of coarse fibers and microfibers in addition to the wetting component as described herein. A second nonwoven mat roll 440 may be positioned above grid 410 so that a second reinforcement mat is applied to a top surface of the grid 410. The second reinforcement mat may also include a conductive material, a wetting component, and/or layer and/or blend of coarse fibers and/or microfibers (similar to or different from reinforcement mat 420). The resulting electrode or plate 450 may subsequently be cut to length via a plate cutter (not shown). As described herein, the active material 430 may be applied to the grid 410 and/or top and bottom of reinforcement mats, 440 and 420, so that the active material impregnates or saturates the mats to a desired degree. The electrode or plate 450 may then be dried via a dryer (not shown) or other component of process 400. As described herein, the reinforcement mats, 440 and 420, may aid in the drying of the electrode or plate 450 by wicking the water and/or water/acid solution from the electrode or plate 450 so as to allow the water and/or water/acid solution to evaporate.

Figure 5:
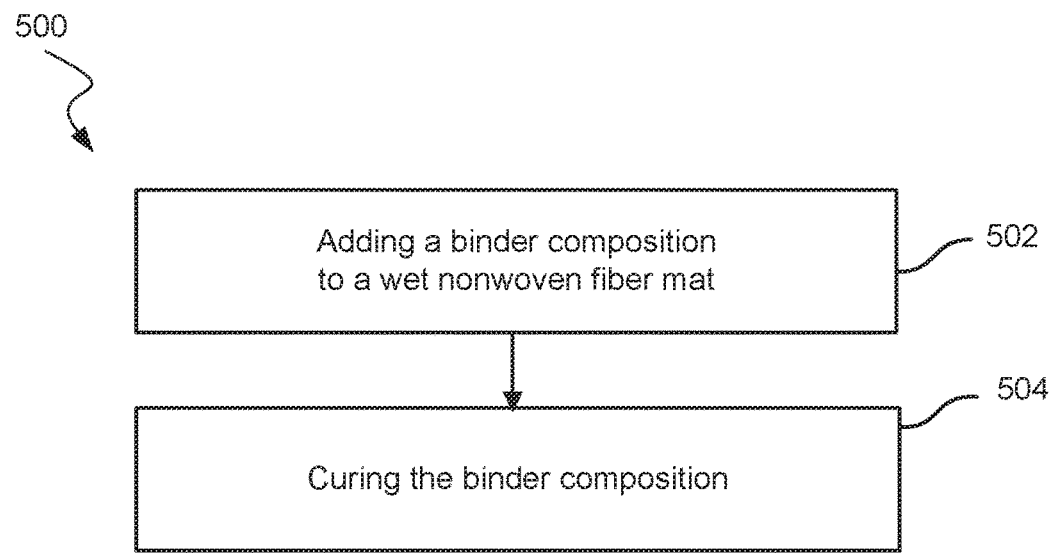
FIG. 5 shows a block diagram of a method of making a nonwoven fiber mat.

Examples of the present technology may include a method of making a non-woven fiber mat for use in a lead-acid battery. FIG. 5 shows a method 500 of making a non-woven fiber mat. Method 500 may include adding a binder composition to a wet nonwoven fiber mat 502. The wet nonwoven fiber mat may include a first plurality of first glass fibers and a second plurality of second glass fibers. The first plurality of first glass fibers may have nominal diameters of less than 5 µm, between about 0.5 µm and about 1.0 µm, or about 0.7 µm, for example. The second plurality of second glass fibers may have nominal diameters of greater than 6 µm. For example, the second glass fibers may have average diameters of between about 8 µm and about 13 µm, between about 8 µm and about 10 µm, or between about 11 µm and 13 µm. The first plurality of first glass fibers may have a weight between about 10% and about 50%, between about 30% and about 40%, between about 40% and about 50%, between about 20% and about 30%, between about 10% and about 20%, or between about 15% and about 30% of the combined weight of the first plurality of first glass fibers and the second plurality of second glass fibers. While conventional nonwoven fiber mats for batteries may include more microfiber than coarse fiber, methods described herein with more coarse fiber than microfiber may produce a nonwoven fiber mat with increased mechanical strength. The mat's increased mechanical strength may accompany a decreased, though still sufficient, wickability.

The first glass fibers may include a first glass composition, and the second glass fibers may include a second glass composition, where the first glass composition is different from the second glass composition. For example, different glass compositions include compositions with alumina, sodium oxide, silicon dioxide, magnesium oxide, calcium oxide, or other compounds. The first glass composition may be the same or different as the second glass composition.

Method 500 may include a wet laid process and/or may exclude a conventional paper-making process. Glass fiber may be added to a white water (also called process water). The fiber may be dispersed in the white water using a pulper to form a slurry. In the slurry, the fiber may have a concentration of 0.2-1.0 wt. %. The method may further include maintaining a pH of the slurry at about 5 or higher. The pH of the slurry may be non-acidic or from neutral to slightly basic. For example, the pH of the slurry may be maintained between about 7 and about 8.5. Without a high concentration of smaller diameter fibers, acid or acidic conditions may not be needed to increase the dispersion of these smaller diameter fibers. Reducing or eliminating the acid needed may possess certain processing advantages. The slurry may be mixed with additional white water and then deposited onto a moving screen. The moving screen may be a forming belt. The screen may dewater the slurry, which may form the wet nonwoven fibrous mat.

The wet nonwoven mat of glass fiber may be transferred to a second moving screen and run through a binder application saturating station. The second moving screen may be called a binder application belt. In the binder application saturating station, an aqueous binder mixture, such as an acrylic binder, may be applied to the mat. The binder may be applied with a curtain coater or a dip and squeeze applicator.

The method may include adding a powdered filler to the binder composition. The powdered filler may be added to the binder composition prior to the application of the binder composition to the wet nonwoven fiber mat. The powdered filler may increase wickability, possibly to counteract the decreased wickability with the decreased concentration of microfibers. The powdered filler may be hydrophilic and acid-resistant. For example, the powdered filler may be silica, precipitated silica, or synthetic fumed silica. The powdered filler may be between about 0.1% and about 20% by weight of the nonwoven fiber mat. For example, the powdered filler may be between about 0.1% and about 10% by weight of the nonwoven fiber mat. The coarse fibers and the microfibers together may help hold the powdered filler in the mixture or slurry or finished nonwoven fiber mat. The filler may be a wetting component.

Examples may further include drying the wet nonwoven fiber mat. Drying the cured slurry may include blowing air through the wet nonwoven fiber mat. A through-air dryer may dry the cured binder composition and the wet nonwoven fiber mat. Drying may be at temperatures from 250° F. to 450° F. or up to 500° F. Drying time may be as little as a few seconds and may not exceed 1 to 2 minutes. Method 500 may exclude drum dryers. Drum dryers may dry conventional nonwoven fiber mats by direct or substantially direct contact. In contrast, because of lower concentrations of microfibers in these and other methods, air may pass through the wet nonwoven fiber mat and dry the mat. Sufficient air to dry the mat may not be able to pass through a conventional nonwoven fiber mat. Methods may also include vacuuming off excess binder. The wet nonwoven fiber mat may be transported to a moving belt to facilitate drying.

Method 500 may also include curing the binder composition 504 and the wet nonwoven fiber mat to produce the nonwoven fiber mat. Curing the binder composition may occur after drying the wet nonwoven fiber mat. Curing the binder composition may result in some chemical reactions including crosslinking reactions but in a lesser amount than the reactions that occur with curing binder compositions for fiberglass insulation and fiber-reinforced composite applications.

With exposure to 40 wt. % sulfuric acid for 10 minutes conducted using method ISO8787, the nonwoven fiber mat may have an average 40 wt. % sulfuric acid wick height of between about 1 cm and about 5 cm, between about 1 cm and about 4 cm, between about 2 cm and about 4 cm, between about 3 cm and about 4 cm, or between about 4 cm and about 5 cm in examples. Sulfuric acid used for wicking measurements may have a specific gravity of 1.28. Water adsorption may be measured by the $Cobb_{60}$ degree. Examples of the present technology may have a $Cobb_{60}$ degree less than one. In other words, the mat adsorbs a weight of water less than the weight of the mat. By contrast, conventional AGM pasting papers may have $Cobb_{60}$ degree measurements several times greater than one. The conventional mats may adsorb a weight of water several times the weight of the mat.

The nonwoven fiber mat may have a total tensile strength greater than 1 lbf/in, greater than 5 lbf/in, greater than 10 lbf/in, greater than 15 lbf/in, greater than 20 lbf/in, or greater than 25 lbf/in. Tensile strength may be less than 50 lbf/in. The tensile strengths of nonwoven fiber mats may have a tensile strength many times larger than those of conventional nonwoven fiber mats. Conventional pasting papers may have a base weight of 0.72 lb/sq and a tensile strength of 2.0 lbf/in (i.e., 6.0 lbf/3 inch). For a 1 inch wide sample, the total tensile strength normalized by weight may be greater than 1.0 (lbf/in)/(lb/sq), greater than 2.0 (lbf/in)/(lb/sq), greater than 7.0 (lbf/in)/(lb/sq), greater than 14.0 (lbf/in)/(lb/sq), greater than 21.0 (lbf/in)/(lb/sq), or greater than 28.0 (lbf/in)/(lb/sq), for example. For a 3 inch wide sample, the total tensile strength normalized by weight may be greater than 50 (lbf/3 in)/(lb/sq), greater than 60 (lbf/3 in)/(lb/sq), or greater than 80 (lbf/3 in)/(lb/sq), or greater than 100 (lbf/3 in)/(lb/sq), according to examples. The normalized tensile strength may be less than 150 (lbf/3 in)/(lb/sq). For the 3 inch wide samples, the normalized tensile strength units of (lbf/3 in)/(lb/sq) can be divided by 3 to get units of (lbf/in)/(lb/sq). The sq may be 100 $ft^2$.

The mixing, adding, drying operations in methods may be continuous processes. These operations may not be batch or semi-batch processes. In other words, these operations may be run continuously and without interruption. Continuous operation may allow for a faster throughput and more cost effective operation.

These or other examples of the present technology may include a lead-acid battery. The battery may include a positive electrode, a negative electrode, and a nonwoven fiber mat disposed adjacent positive electrode or the negative electrode. The nonwoven fiber mat include a first plurality of first glass fibers having nominal diameters of less than 5 μm. The nonwoven fiber mat may further include a second plurality of second glass fibers having nominal diameters greater than 6 μm. The first plurality of first glass fibers may make up between about 10% and about 50% by weight of the combined weight of the first plurality of first glass fibers and the second plurality of second glass fibers. The first plurality of first glass fibers may be any percentage weight described herein. The nonwoven fiber mat may also include a binder composition. The nonwoven fiber mat may have an average 40 wt. % sulfuric acid wick height of between about 1 cm and about 5 cm after exposure to 40 wt. % sulfuric acid for 10 minutes conducted according to method ISO8787, while the nonwoven fiber mat may have a total tensile strength of greater than 2 (lbf/in)/(lb/sq). The nonwoven fiber mat may be any nonwoven fiber mat described herein. The lead-acid battery may further include a filler. The filler may be precipitated silica, synthetic fumed silica, or any filler described herein.

Figure 6:
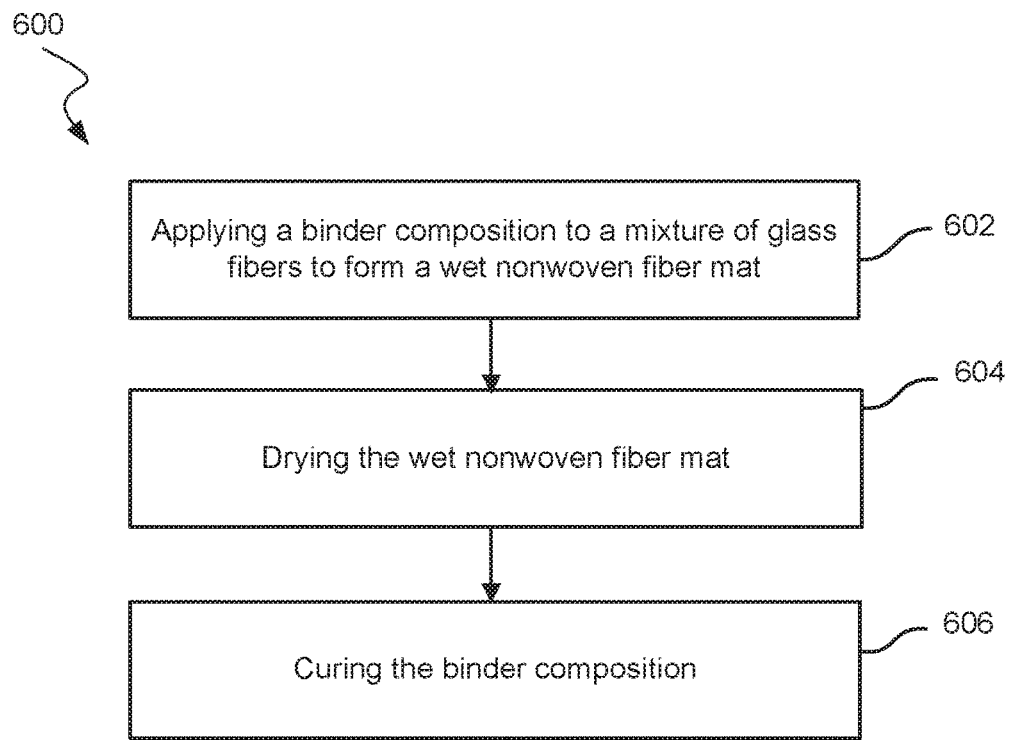
FIG. 6 shows a block diagram of a method of making a pasting paper.

FIG. 6 shows an example method 600 of making a pasting paper for battery. Method 600 may include applying acid-resistant binder composition to a wet-laid mixture of glass fibers to form a wet nonwoven fiber mat 602. The binder composition may be applied according to any of the methods described herein. The mixture of glass fibers may include a first plurality of microfibers having an average diameter of between 0.5 μm and 1.0 μm and a second plurality of coarse fibers having an average diameter greater than or equal to 8 μm. The mass ratio of the first plurality of microfibers to the second plurality of coarse fibers may be between about 1:5 and about 1:1. The mixture of glass fibers may be any mixture described herein. Method 600 may also include drying the wet nonwoven fiber mat 604. Drying may be carried out by any of the methods described herein. Method 600 may further include curing the acid-resistant binder composition 606 to produce a pasting paper. Curing may be accomplished according to any of the methods described herein. The pasting paper may have an average 40 wt. % sulfuric acid wick height of between about 1 cm and about 5 cm after exposure to 40 wt. sulfuric acid for 10 minutes conducted according to method ISO8787. In addition, pasting paper may have a total tensile strength of greater than 7 (lbf/in)/(lb/sq). The pasting paper may be any nonwoven fiber mat described herein.

EXAMPLE 1

Nonwoven glass mat samples were made with a wet-laid machine. Process water with pH greater than 5 was used. The following Johns Manville glass fibers were used: K249T with a nominal fiber diameter of about 13 μm and a length of ¾ inch; 206-253 with a nominal fiber diameter of about 0.765 μm; 210x-253 with a nominal fiber diameter of about 3.0 μm; and 8 μm/8 mm C glass with a nominal fiber diameter of about 8 μm and a length of 8 mm. The compositions of the nonwoven fiber mats are shown in Table 1.

Air permeability was measured by the Frazier test, which is described by ASTM Standard Method D737. This test was usually carried out at a differential pressure of about 0.5 inches of water. Wicking strength per length or capillary rise was determined by ISO8787, with the wicking medium being 40 wt. % sulfuric acid. Thickness was measured with a gauge under pressure of 1.868 kPa or 10 kPa. Tensile strength of a 1 inch wide sample was measured using an ASTM method by an Instron machine. Tensile strength was measured in the machine direction (MD) and the cross-machine direction (CMD). The performance of the nonwoven fiber mats is shown in Table 2.

TABLE 1

Nonwoven fiber mat properties

| Sample ID | Mat Weight (lb/sq) | LOI | Microfiber % | Coarse Fiber | Microfiber |
|---|---|---|---|---|---|
| A | 0.7 | 10% | 50 | K249T | 206-253 |
| B | 0.7 | 20% | 50 | K249T | 206-253 |
| C | 0.7 | 5% | 40 | K249T | 206-253 |
| D | 0.7 | 10% | 40 | K249T | 206-253 |
| E | 0.7 | 20% | 40 | K249T | 206-253 |
| F | 0.7 | 10% | 30 | K249T | 206-253 |
| G | 0.7 | 20% | 30 | K249T | 206-253 |
| H | 0.5 | 5% | 40 | K249T | 206-253 |
| I | 0.5 | 10% | 40 | K249T | 206-253 |
| J | 0.5 | 20% | 40 | K249T | 206-253 |
| K | 0.5 | 10% | 30 | K249T | 206-253 |
| L | 0.5 | 20% | 30 | K249T | 206-253 |
| M | 0.7 | 10% | 50 | 8um/8mmC | 210X-253 |
| N | 0.7 | 10% | 80 | 8um/8mmC | 210X-253 |
| O | 0.7 | 10% | 50 | K249T | 210X-253 |
| P | 0.7 | 10% | 80 | K249T | 210X-253 |

TABLE 2

Nonwoven glass mat performance characteristics

| Sample ID | Ave. Air Perm (cfm/ft²) | Ave. Thickness under 1.686 kPa (mil) | Ave. Thickness under 10 kPa (mil) | Ave. Wicking Length at 10 min. (cm) | Ave. Wicking Length at 1 hr (cm) | Ave. MD Tensile (lbf/in) | Ave. CMD Tensile (lbf/in) | Total tensile strength normalized by weight [(lbf/in)/(lb/sq)] |
|---|---|---|---|---|---|---|---|---|
| A | 69.7 | 13.8 | 5.0 | 2.3 | 4.55 | 0.73 | 0.85 | 2.26 |
| B | 63.4 | 17.3 | 6.3 | 1.55 | 3.65 | 2.03 | 2.7 | 6.76 |
| C | 60.2 | 13.75 | 4.9 | 2.0 | 4.2 | 0.33 | 0.3 | 0.90 |
| D | 115 | 13.95 | 5.6 | 1.6 | 3.15 | 1.1 | 1.25 | 3.36 |
| E | 116.7 | 14.85 | 6.1 | 0.8 | 1.95 | 2.53 | 2.82 | 7.64 |
| F | 144.1 | 13.7 | 6.1 | 1.2 | 2.65 | 1.86 | 2.36 | 6.03 |
| G | 208.5 | 13.5 | 7.0 | 0.3 | 0.8 | 5.2 | 5.18 | 14.8 |
| H | 131.8 | 11.2 | 4.0 | 0.9 | 2.9 | 0.19 | 0.22 | 0.82 |
| I | 171.5 | 11.75 | 4.2 | 0.45 | 1.25 | 1.0 | 1.33 | 4.66 |
| J | 304.3 | 11.05 | 4.0 | 0.3 | 1.5 | 2.2 | 3.8 | 12 |
| K | 325.7 | 10.35 | 4.1 | 0.2 | 0.45 | 1.31 | 1.85 | 6.32 |
| L | 435.6 | 9.55 | 4.5 | 0.5 | 1.0 | 2.73 | 4.27 | 14 |
| M | 398.5 | 10.1 | 3.9 | 0.3 | 0.7 | 0.57 | 0.48 | 1.50 |
| N | 350.0 | 12.15 | 4.5 | 0.35 | 0.55 | 0.58 | 0.55 | 1.61 |
| O | 567.8 | 12.9 | 5.2 | 0.3 | 0.55 | 1.27 | 2.33 | 5.14 |
| P | 382.3 | 14.15 | 5.0 | 0.4 | 0.55 | 0.62 | 0.98 | 2.29 |

When the percentage of microfiber increases from 30% to 50%, especially for microfiber 206-253, the processing difficulty increases. A nonwoven glass mat with 206-253 at 50% and LOI at 10% is challenging to process because of lower strength of the mat. When the concentration of the microfibers is too high, pulling the mat off the formation belt may be difficult. During removal of the mat, the mat may break as a result of its low wet web strength.

EXAMPLE 2

Nonwoven glass mat samples were made with a wet-laid machine. Process water with pH greater than 5 was used. The following Johns Manville glass fibers were used: K249T with a nominal fiber diameter of about 13 μm and a length of ¾ inch; and 206-253 with a nominal fiber diameter of about 0.765 μm.

Air permeability was measured by the TEXTEST™ FX 3300 according to ASTM Standard Method D737. This test was usually carried out at a differential pressure of about 0.5 inches of water (125 Pa). Wicking strength per length or capillary rise was determined by ISO8787, with the wicking medium being 40 wt. % sulfuric acid. Thickness was measured with a gauge under pressure of 10 kPa. Tensile strength of a 3 inch wide sample was measured using an ASTM method by an Instron machine.

Table 3 shows the compositions of nonwoven fiber mats along with results. Total tensile strength is normalized by the weight of the mat. The normalized tensile strength is significantly higher for samples in this example than in Example 1, primarily a result of a higher base weight.

TABLE 3

Nonwoven fiber mat properties

| K249T/ 206-253 ratio | LOI (%) | Base wt. (lb/sq) | Air perm (cfm) | MD Tensile (lbf/3") | CD Tensile (lbf/3") | Wicking length @1 hr (cm) | Thickness (mil) @10 kPa | Total tensile strength normalized by weight [(lbf/in)/(lb/sq)] |
|---|---|---|---|---|---|---|---|---|
| 90/10 | 26.4 | 1.17 | 300 | 80 | 46 | 0.9 | 11 | 36 |
| 80/20 | 18.7 | 1.14 | 183 | 45.4 | 25.9 | 3.5 | 9.7 | 21 |
| 80/20 | 14.7 | 1.16 | 176 | 39.4 | 17.5 | 3.9 | 8.9 | 16 |
| 80/20 | 19.5 | 1.18 | 158 | 53.1 | 26.5 | 4.4 | 9.5 | 22 |
| 75/25 | 17.6 | 1.12 | 101 | 43.6 | 16 | 4.6 | 7.6 | 18 |
| 75/25 | 18.1 | 1.21 | 105 | 47 | 18.9 | 4.9 | 9.7 | 18 |
| 75/25 | 19.8 | 1.14 | 114 | 45.3 | 20.4 | 4.8 | 8.4 | 19 |

EXAMPLE 3

Samples were measured for their $Cobb_{60}$ degree as an indication of their hydrophilic or wickability properties. The following Johns Manville glass fibers were used: K249T with a nominal fiber diameter of about 13 μm and a length of ¾ inch; and 206-253 with a nominal fiber diameter of about 0.765 μm. In these experiments, a 1.1 lb/sq mat with 75% K249T and 25% 206-253 with 20% LOI were used. Both sides of samples—the binder rich side and the wire side—were measured. The results are shown in Tables 4 and 5.

TABLE 4

Binder-rich side $Cobb_{60}$ degree

| Sample | Absorded amount (g) | Absorded amount (g/m²) | Absorded amount (g water/g mat) |
|---|---|---|---|
| 1 | 0.42 | 42 | 0.78 |
| 2 | 0.45 | 45 | 0.84 |
| 3 | 0.38 | 38 | 0.71 |
| 4 | 0.37 | 37 | 0.69 |
| 5 | 0.37 | 37 | 0.69 |
| 6 | 0.35 | 35 | 0.65 |
| 7 | 0.37 | 37 | 0.69 |
| Average | 0.39 | 38.71 | 0.72 |
| Std. Dev. | 0.03 | 3.50 | 0.07 |

TABLE 5

Wire side $Cobb_{60}$ degree

| Sample | Absorded amount (g) | Absorded amount (g/m²) | Absorded amount (g water/g mat) |
|---|---|---|---|
| 1 | 0.43 | 43 | 0.80 |
| 2 | 0.47 | 47 | 0.88 |
| 3 | 0.41 | 41 | 0.76 |
| 4 | 0.41 | 41 | 0.76 |
| 5 | 0.45 | 45 | 0.84 |
| 6 | 0.45 | 45 | 0.84 |
| 7 | 0.39 | 39 | 0.73 |
| Average | 0.43 | 43.00 | 0.80 |
| Std. Dev. | 0.03 | 2.83 | 0.05 |

With all samples tested, the $Cobb_{60}$ degree is less than 1. This means that the sample adsorbs a weight of water less than or equal to the weight of the mat.

EXAMPLE 4

Nonwoven glass mat samples were made with a wet-laid machine, with process water with a pH greater than 5. The following Johns Manville glass fibers were used: K249T with a nominal fiber diameter of about 13 μm and a length of ¾ inch; and 206-253 with a nominal fiber diameter of about 0.765 μm. Silica (Hi-Sil 233 from PPG Industries) was also added. Results are shown in Table 6. Increasing the silica amount increases the wicking length.

TABLE 6

Wicking length with silica

| K249T/206-253 ratio | LOI (%) | Base wt. (lb/sq) | Wt. % of silica in the mat | Air perm (cfm) | Wicking length @10 mins (cm) |
|---|---|---|---|---|---|
| 70/30 | 20.3 | 1.11 | 0 | 77 | 1.1 |
| 70/30 | 23 | 1.45 | 12.7 | 11 | 4.4 |
| 70/30 | 25.9 | 1.16 | 15.3 | 3.2 | 4.3 |

In the preceding description, for the purposes of explanation, numerous details have been set forth in order to provide an understanding of various examples of the present technology. It will be apparent to one skilled in the art, however, that certain examples may be practiced without some of these details, or with additional details.

Having described several examples, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific example may not always be present in variations of that example or may be added to other examples.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lead-acid battery comprising:
    a positive electrode;
    a negative electrode; and
    a nonwoven fiber mat disposed adjacent the positive electrode or the negative electrode, wherein:
        the nonwoven fiber mat comprises a first plurality of first glass fibers having nominal diameters of less than 5 µm,
        the nonwoven fiber mat comprises a second plurality of second glass fibers having nominal diameters greater than 6 µm,
        the first plurality of first glass fibers comprises between about 10% and about 50% by weight of the combined weight of the first plurality of first glass fibers and the second plurality of second glass fibers,
        the nonwoven fiber mat comprises a binder composition,
        the nonwoven fiber mat has a $Cobb_{60}$ degree of less than 1, and
        the nonwoven fiber mat has a total normalized tensile strength of greater than 2 (lbf/in)/(lb/sq).

2. The lead-acid battery of claim 1, wherein the nonwoven fiber mat further comprises synthetic precipitated silica.

3. The lead-acid battery of claim 1, wherein the first plurality of first glass fibers has an average diameter of between 0.5 µm and 1.0 µm.

4. The lead-acid battery of claim 1, wherein the first plurality of first glass fibers has an average diameter of about 0.7 µm.

5. The lead-acid battery of claim 1, wherein the second plurality of second glass fibers has an average diameter of between about 8 µm and about 13 µm.

6. The lead-acid battery of claim 1, wherein:
    the first glass fibers comprise a first glass compound,
    the second glass fibers comprise a second glass compound, and
    the first glass compound is different from the second glass compound.

7. The lead-acid battery of claim 1, further comprising a powdered filler.

8. The lead-acid battery of claim 7, wherein the powdered filler is hydrophilic and acid-resistant.

9. The lead-acid battery of claim 7, wherein the powdered filler comprises between about 0.1% and about 20% by weight of the nonwoven fiber mat.

10. The lead-acid battery of claim 1, wherein the nonwoven fiber mat has an average 40 wt. % sulfuric acid wick height of between about 2 cm and about 4 cm after exposure to 40 wt. % sulfuric acid for 10 minutes conducted according to method ISO8787.

11. The lead-acid battery of claim 1, wherein the nonwoven fiber mat has a total normalized tensile strength of greater than 7 (lbf/in)/(lb/sq).

12. The lead-acid battery of claim 1, wherein the nonwoven fiber mat has a total normalized tensile strength of greater than 14 (lbf/in)/(lb/sq).

13. The lead-acid battery of claim 1, wherein the nonwoven fiber mat has a total normalized tensile strength of greater than 28 (lbf/in)/(lb/sq).

14. The lead-acid battery of claim 1, wherein the nonwoven fiber mat is disposed adjacent to the negative electrode.

15. The lead-acid battery of claim 14, wherein the nonwoven fiber mat fully envelops the negative electrode.

16. The lead-acid battery of claim 1, further comprising:
    an electrolyte disposed within a separator,
    wherein:
        the separator does not comprise the nonwoven fiber mat,
        the positive electrode comprises a grid or conductor of lead alloy material, and
        the negative electrode comprises a grid or conductor of lead alloy material.

17. A lead-acid battery comprising:
    a positive electrode;
    a negative electrode; and
    a pasting paper disposed adjacent the positive electrode or the negative electrode, wherein:
        the pasting paper comprises a first plurality of microfibers having an average diameter of between 0.5 µm and 1.0 µm,
        the pasting paper comprises a second plurality of coarse fibers having an average diameter greater than or equal to 8 µm,
        the mass ratio of the first plurality of microfibers to the second plurality of coarse fibers is between about 1:5 and about 1:1,
        the pasting paper comprises a binder composition,
        the pasting paper has a $Cobb_{60}$ degree of less than 1, and
        the pasting paper has a total normalized tensile strength of greater than 7 (lbf/in)/(lb/sq).

18. The lead-acid battery of claim 1, wherein the nonwoven fiber mat has an average 40 wt. % sulfuric acid wick height of between about 1 cm and about 5 cm after exposure to 40 wt. % sulfuric acid for 10 minutes conducted according to method ISO8787.

19. The lead-acid battery of claim 17, wherein the pasting paper has an average 40 wt. % sulfuric acid wick height of between about 1 cm and about 5 cm after exposure to 40 wt. % sulfuric acid for 10 minutes conducted according to method ISO8787.

20. The lead-acid battery of claim 1, wherein the nonwoven fiber mat is produced by a method comprising:
    mixing the first plurality of first glass fibers and a second plurality of second glass fibers to form a slurry,
    maintaining a pH of the slurry at about 5 or higher,
    removing water from the slurry to form a wet nonwoven fiber mat, wherein the wet nonwoven fiber mat comprises the first plurality of first glass fibers and the second plurality of second glass fibers,
    adding the binder composition to the wet nonwoven fiber mat, and
    curing the binder composition to produce the nonwoven fiber mat.

* * * * *